(12) United States Patent
Seki et al.

(10) Patent No.: US 9,947,917 B2
(45) Date of Patent: Apr. 17, 2018

(54) ALUMINUM ALLOY FOIL FOR CURRENT COLLECTOR OF ELECTRODE, AND MANUFACTURING METHOD THEREOF

(71) Applicants: UACJ Corporation, Chiyoda-ku, Tokyo (JP); UACJ Foil Corporation, Chuo-ku, Tokyo (JP)

(72) Inventors: Masakazu Seki, Chiyoda-ku (JP); Satoshi Suzuki, Chiyoda-ku (JP); Tomohiko Furutani, Kusatsu (JP)

(73) Assignees: UACJ Corporation, Chiyoda-ku, Tokyo (JP); UACJ Foil Corporation, Chuo-ku, Tokyo (JP)

( * ) Notice: Subject to any disclaimer, the term of this patent is extended or adjusted under 35 U.S.C. 154(b) by 0 days.

(21) Appl. No.: 15/031,476

(22) PCT Filed: Oct. 21, 2014

(86) PCT No.: PCT/JP2014/077946
§ 371 (c)(1),
(2) Date: Apr. 22, 2016

(87) PCT Pub. No.: WO2015/060300
PCT Pub. Date: Apr. 30, 2015

(65) Prior Publication Data
US 2016/0276653 A1   Sep. 22, 2016

(30) Foreign Application Priority Data
Oct. 25, 2013   (JP) ................ 2013-221850

(51) Int. Cl.
| H01M 4/134 | (2010.01) |
| B21B 3/00 | (2006.01) |
| C22C 21/00 | (2006.01) |
| C22F 1/04 | (2006.01) |
| H01G 11/68 | (2013.01) |
| H01M 4/66 | (2006.01) |
| H01G 11/28 | (2013.01) |
| H01G 11/84 | (2013.01) |
| B21B 1/28 | (2006.01) |
| B21B 1/40 | (2006.01) |
| B21B 1/46 | (2006.01) |
| B22D 11/00 | (2006.01) |
| H01B 5/02 | (2006.01) |
| H01G 11/50 | (2013.01) |
| H01M 4/46 | (2006.01) |
| H01M 10/052 | (2010.01) |
| B21B 1/22 | (2006.01) |

(52) U.S. Cl.
CPC ............ H01M 4/134 (2013.01); B21B 1/28 (2013.01); B21B 1/40 (2013.01); B21B 1/463 (2013.01); B21B 3/00 (2013.01); B21B 3/003 (2013.01); B22D 11/003 (2013.01); C22C 21/00 (2013.01); C22F 1/04 (2013.01); H01B 5/02 (2013.01); H01G 11/28 (2013.01); H01G 11/50 (2013.01); H01G 11/68 (2013.01); H01G 11/84 (2013.01); H01M 4/463 (2013.01); H01M 4/662 (2013.01); B21B 2001/221 (2013.01); B21B 2003/001 (2013.01); H01M 10/052 (2013.01); Y02E 60/13 (2013.01); Y02T 10/7022 (2013.01)

(58) Field of Classification Search
USPC ..................................................... 174/126.2
See application file for complete search history.

(56) References Cited

U.S. PATENT DOCUMENTS

| 2013/0269842 A1* | 10/2013 | Seki ................. C22C 21/00 148/691 |
| 2014/0178709 A1 | 6/2014 | Seki et al. |
| 2014/0205900 A1 | 7/2014 | Seki et al. |

FOREIGN PATENT DOCUMENTS

| FR | 1208006 A | * | 2/1960 | ............ C22C 21/00 |
| JP | 06-93397 A | | 4/1994 | |
| JP | 06-101004 A | | 4/1994 | |
| JP | 2010-150637 A | | 7/2010 | |
| JP | 2010150637 A | * | 7/2010 | |
| JP | 2011-179062 A | | 9/2011 | |
| JP | 2011-241410 A | | 12/2011 | |
| JP | 2013-256700 A | | 12/2013 | |
| WO | 2013/018162 A1 | | 2/2013 | |

(Continued)

OTHER PUBLICATIONS

International Search Report dated Jan. 13, 2015, issued in corresponding International Application No. PCT/JP2014/077946, filed Oct. 21, 2014, 4 pages.

(Continued)

*Primary Examiner* — William H Mayo, III
*Assistant Examiner* — Krystal Robinson
(74) *Attorney, Agent, or Firm* — Christensen O'Connor Johnson Kindness PLLC

(57) ABSTRACT

An aluminum alloy foil for a current collector of an electrode is provided which has not only high electric conductivity but also high strength before and after a drying step, and is low in manufacturing cost. Provided is an aluminum alloy foil for a current collector of an electrode, containing 1.0 to 2.0 mass % (hereafter, simply referred to as "%") of Fe, 0.01 to 0.2% of Si, 0.0001 to 0.2% of Cu, and 0.005 to 0.3% of Ti, the remainder being Al and inevitable impurities, wherein an amount of Fe contained as a solid solution is 300 ppm or more, and particles of intermetallic compounds having an equivalent circle diameter of 0.1 to 1.0 μm exist at $1.0 \times 10^5$ particles/mm$^2$ or more.

3 Claims, No Drawings

(56) References Cited

FOREIGN PATENT DOCUMENTS

WO      2013/018165   A1     2/2013
WO      2014/087827   A1     6/2014

OTHER PUBLICATIONS

Extended European Search Report, dated Oct. 14, 2016, issued in corresponding European Application No. 14 85 6322.4, filed Oct. 21, 2014, 9 pages.

* cited by examiner

ALUMINUM ALLOY FOIL FOR CURRENT COLLECTOR OF ELECTRODE, AND MANUFACTURING METHOD THEREOF

TECHNICAL FIELD

The present invention relates to an aluminum alloy foil used in a secondary cell, an electric double-layer capacitor, a lithium ion capacitor and the like and a manufacturing method of the alloy foil.

BACKGROUND

As an electric power source of a portable electronic device such as a cellular phone and a notebook-size personal computer is used a lithium ion secondary cell which has high energy density.

An electrode material of the lithium ion secondary cell consists of a positive electrode material, a separator and a negative electrode material. For the positive electrode material, an aluminum alloy foil, which has properties that electric conductivity is excellent, electric efficiency of the secondary cell is not affected, and heat generation is small, is used as a support. For example, in Patent Document 1 an aluminum alloy hard foil is proposed which contains Fe, Mn and Si, has high tensile strength and ductility, and is excellent in bending resistance.

An active material whose main component is a metal oxide containing lithium, e.g., $LiCoO_2$, is applied to a surface of the aluminum alloy foil. An manufacturing method is as follows: each of both surfaces of an aluminum alloy foil with a thickness of about 20 μm is applied with an active material of about 100 μm thickness, and a thermal drying process is performed to remove a solvent in the active material (hereafter, simply referred to as drying step). Further, in order to increase a density of the active material, a pressing process is performed by a press machine (hereafter, the "pressing step performed by a press machine" is referred to as press processing). A positive electrode plate thus manufactured is laminated with a separator and a negative electrode plate, then wound, shaped for accommodation in a case, and accommodated in the case.

An aluminum alloy foil for a lithium ion secondary cell is generally manufactured by a semi-continuous casting method. In a semi-continuous casting method an ingot is cast from a molten aluminum alloy, an aluminum alloy plate material (foil base) with a thickness of approximately 0.2 to 0.6 mm is manufactured by hot rolling and cold rolling, and thereafter, the thickness is adjusted to approximately 6 to 30 μm by foil rolling. Note that intermediate annealing is usually performed during homogenization of the ingot or cold rolling, if needed. For example, in Patent Document 2, proposed is an aluminum alloy foil having a strength of 160 MPa or more manufactured by the semi-continuous casting method for a current collector of an electrode of a lithium ion cell.

A continuous casting method can cast/roll molten aluminum alloy continuously to yield an aluminum alloy plate (hereafter, an aluminum alloy plate manufactured by the continuous casting method is referred to as a cast plate). Therefore, according to the continuous casting method, the homogenization process and the hot rolling step which are indispensable steps in the semi-continuous casting method can be omitted, so that yield and energy efficiency can be improved allowing reduction in manufacturing cost. Representative continuous casting methods include a twin-roll type continuous casting method, a twin-belt type continuous casting method and the like. A cast plate manufactured by the continuous casting method is generally subjected to a heating process between the steps of cold rolling in order to improve rollability. For example, a method of manufacturing an aluminum alloy foil base is proposed in Patent Document 3 in which a cast plate with a thickness of 25 mm or less is obtained by the continuous casting method, then cold rolling of 30% or more is performed and thereafter a heating process at a temperature of 400° C. or higher is performed, and further an intermediate annealing at 250 to 450° C. is performed.

PRIOR ART DOCUMENTS

Patent Documents

Patent Document 1: Japanese Unexamined Patent Application Publication No. 2011-179062
Patent Document 2: Japanese Unexamined Patent Application Publication No. 2010-150637
Patent Document 3: Japanese Unexamined Patent Application Publication No. H6-93397

SUMMARY

Problems to be Solved by the Invention

However, the prior arts described in the above documents have room for improvement in the following points. Firstly, in recent years high electric conductivity is required for an aluminum alloy foil used as an electrode material of a lithium ion secondary cell. Electric conductivity is a physical property indicative of easiness of flow of electricity in a substance; the higher the electric conductivity is, the easier the flow of electricity is. For a lithium ion secondary cell used in an automobile, an electrical power tool and the like, a property of greater output is required than for a lithium ion secondary cell for consumer use, for example, those used in a cellular phone or a laptop computer. If electric conductivity is low, when a large electric current flows, internal resistance of the cell increases so that a problem is caused that an output voltage of the cell is lowered. In the aluminum alloy foil described in Patent Document 1, though strength after heating, which is assumed to be a drying step performed after an active material is applied, is high since a large amount of added Mn is contained in the aluminum alloy as a solid solution, there is a problem that high electric conductivity cannot be achieved.

Secondly, high tensile strength is required for an aluminum alloy foil used as a positive electrode material of a lithium ion secondary cell in order to avoid breakage caused by a tensile force when an active material is applied or fracture at a bend portion when winding is performed. Further, in the drying step after application of an active material, a heating process at 100 to 160° C. is performed conventionally, and, in recent years, a heating process at a still higher temperature of about 200° C. is sometime performed. Thereafter a press step is performed in order to increase a density of the active material. While strength of an aluminum alloy foil after being subjected to a heating process is reduced generally compared to a blank plate, sufficient strength to bear compression strength in a press step after the drying step is required, so that high tensile strength is required even after the drying step.

However, strength of the aluminum alloy foil in Patent Document 2 is low after subjected to the heating process assumed to be the drying step, making the aluminum alloy foil deform easily after press processing, and easily provoking lowered adhesiveness between the active material and the aluminum alloy foil or breakage at the time of slitting, and thus insufficient. Further, although the aluminum alloy foil obtained from the aluminum alloy foil base of Patent Document 3 has a good rolling property since a heating process is performed, various elements contained as a supersaturated solid solution have been precipitated, so that strength after the heating process assumed to be the drying step is low, making the aluminum alloy foil deform easily during press processing, and easily provoking lowered adhesiveness between the active material and the aluminum alloy foil or breakage at the time of slitting, and thus insufficient.

If strength is lowered after the drying step as mentioned above, fatal problems in manufacturing a cell possibly arise, such that a center wave tends to occur during press processing, a winding wrinkle occurs during winding, lowering of adhesiveness between the active material and the aluminum alloy foil or breakage during slitting easily occurs. In particular, if adhesiveness between the active material and the aluminum alloy foil is lowered, exfoliation proceeds during repeated charging/discharging, resulting in a problem that cell capacity is reduced.

Thus, for an aluminum alloy foil used in a positive electrode of a lithium ion secondary cell, the followings are respectively required: thinning in order to enhance cell capacity; securing blank plate strength in order to prevent breakage in an applying step of an active material paste; enhancing strength after the drying step in order to prevent wrinkling in a press step; and securing high electric conductivity in order to improve cell properties.

The present invention has been made considering the above-mentioned circumstances, and an object thereof is to provide an aluminum alloy foil for a current collector of an electrode which has not only high electric conductivity but also high strength before and after a drying step, and can be manufactured at low cost.

Means to Solve the Problem

According to the present invention, an aluminum alloy foil for a current collector of an electrode is provided, which contains 1.0 to 2.0 mass % (hereafter, simply referred to as "%") of Fe, 0.01 to 0.2% of Si, 0.0001 to 0.2% of Cu, and 0.005 to 0.3% of Ti, the remainder being Al and inevitable impurities, wherein an amount of Fe contained as a solid solution is 300 ppm or more, and particles of intermetallic compounds having an equivalent circle diameter of 0.1 to 1.0 μm exist at $1.0 \times 10^5$ particles/mm$^2$ or more.

This aluminum alloy foil has not only high electric conductivity but also high strength before and after a drying step. Therefore, the aluminum alloy foil hardly deforms during press processing, and exfoliation of an active material or the like and breakage during slitting can be prevented. Accordingly, the aluminum alloy foil can be preferably employed as a current collector of an electrode used in an electrode assembly of an electricity storage component.

Further, according to the present invention, a method of manufacturing an aluminum alloy foil for a current collector of an electrode is provided, which comprises a step of manufacturing, by a continuous casting method, a cast plate having a composition of 1.0 to 2.0 mass % (hereafter, simply referred to as "%") of Fe, 0.01 to 0.2% of Si, 0.0001 to 0.2% of Cu, and 0.005 to 0.3% of Ti, the remainder being Al and inevitable impurities, and a step of performing on said cast plate cold rolling and foil rolling without performing a heating process.

According to the method, an aluminum alloy foil for a current collector of an electrode can be manufactured at low cost that has not only high electric conductivity but also high strength before and after a drying step. Therefore, the aluminum alloy foil obtained by the method hardly deforms during press processing, and exfoliation of an active material or the like and breakage during slitting can be prevented. Accordingly, the aluminum alloy foil obtained by the method can be suitably employed as a current collector of an electrode used in an electrode assembly of an electricity storage component.

Note that the aluminum alloy foil for a current collector of an electrode or the manufacturing method thereof mentioned above is merely an embodiment of the present invention, and a current collector of an electrode, an electrode assembly, manufacturing method thereof or the like of the present invention also has a similar configuration and effect.

Advantageous Effect of the Invention

According to the present invention, an aluminum alloy foil for a current collector of an electrode that has not only high electric conductivity but also high strength before and after a drying step can be manufactured at low cost.

DETAILED DESCRIPTION OF PREFERRED EMBODIMENTS

Hereafter, an embodiment of the present invention will be described in detail. Note that for similar configurations explanation will be omitted appropriately to avoid cumbersome repetition. Further, in the present description, "A to B" should be understood to mean "greater than or equal to A and less than or equal to B".

<History of the Invention>

The inventors of the present invention had been studying aluminum alloy foils used for a positive electrode material or the like of a lithium ion secondary cell or the like, and found that an aluminum alloy foil (also referred to as a bare foil) which was obtained by limiting constituents of a molten aluminum alloy into a proper range, manufacturing a cast plate by a continuous casting method, and subsequently performing no heating process between steps of cold rolling and foil rolling had high strength and was capable of maintaining high strength and high electric conductivity even after a drying step performed after applying an active material or the like.

Further, a cooling rate of the molten metal in a continuous casting method is greater than that in a common semi-continuous casting method, so that elements added to aluminum are forced to be contained as a supersaturated solid solution and intermetallic compounds crystallize out uniformly and finely. The inventors found that, in the above circumstance, by achieving a composition, an amount contained as a solid solution as well as a size and a number of particles of the crystallizing compounds of the present invention, an aluminum alloy foil was obtained that could be suitably used as an aluminum alloy foil for a current collector. As a result, the inventors found that an aluminum alloy foil manufactured by the continuous casting method could have higher strength than those by the semi-continuous casting method.

Thereafter, even if the cast plate manufactured by the continuous casting method was subjected to hot rolling or to a heating process performed as intermediate annealing in cold rolling and foil rolling, though Fe contained as a supersaturated solid solution crystallized out partially and thus decreased in amount, due to dispersion strengthening by intermetallic compounds that crystallized out, the inventors could obtain an aluminum alloy foil that had higher strength than those manufactured by a common semi-continuous casting method.

Further, by performing only cold rolling and foil rolling and omitting a heating process after performing the continuous casting method, strength of the bare foil was still higher and the inventors could obtain an aluminum alloy foil that had higher strength even after a drying step. Moreover, the inventors could obtain an aluminum alloy foil for a current collector which could reduce manufacturing cost, by omitting a heating process on a cast plate manufactured by the continuous casting method.

That is, what are considered important by the inventors in arriving at the invention are (1) a cast plate containing four elements of Fe, Si, Cu and Ti is manufactured by a continuous casting method, and (2) performing cold rolling and foil rolling sequentially on the cast plate without performing a heating process to yield an aluminum alloy foil. Especially important points are that a contained amount of Fe, which is a component of the aluminum alloy, is set to be 1.0 to 2.0%, and that an aluminum alloy foil in which an amount of Fe contained as a solid solution as well as a size and a number of particles of intermetallic compounds is controlled is manufactured by a continuous casting method.

According to experiments of the inventors, it was found that, in manufacturing a cast plate by a continuous casting method, controlling optimally an amount of Fe to be added, and thereafter performing cold rolling and foil rolling sequentially on the cast plate without performing a heating process, an amount of Fe contained as a solid solution in an aluminum alloy could be increased compared to that of an aluminum alloy foil manufactured by the semi-continuous casting method, which is a common manufacturing method, and that fine particles of intermetallic compounds, which contributed greatly to enhancement of strength, could also be dispersed more. Further, it was confirmed that even when a heating process at 100 to 200° C. was performed on this aluminum alloy foil, strength comparable to or higher than that before the heating process was maintained, which is worthy of special mention. This means that strength of an aluminum alloy foil is not decreased very much by a drying step at 100 to 200° C. or so, which is usually performed for the purpose of, for example, removing a solvent in manufacturing an electrode using an aluminum alloy foil for a current collector of an electrode, and that the aluminum alloy foil of the present invention has a very excellent property as an aluminum alloy foil for a current collector of an electrode.

<Aluminum Alloy Foil for Current Collector of Electrode>

The aluminum alloy foil for a current collector of an electrode of the present embodiment is suitable as an electrode material used in a secondary cell, an electric double-layer capacitor, a lithium ion capacitor and the like. Further, the aluminum alloy foil for a current collector of an electrode of the present embodiment is especially suitable as an electrode material for a positive electrode or an electrode material for a negative electrode used in a lithium ion secondary cell.

According to the present embodiment, an aluminum alloy foil for a current collector of an electrode is provided which has a predetermined component composition, a predetermined or higher value of an amount of Fe contained as a solid solution, and a size and a number of particles of intermetallic compounds fulfilling predetermined criteria. This aluminum alloy foil has high strength before and after a drying step as well as high electric conductivity. In particular, due to the fact that strength after a drying step after applying an active material is high, this aluminum alloy foil hardly deforms during press processing, and exfoliation of an active material or the like and breakage during slitting can be prevented. Consequently, this aluminum alloy foil can be employed suitably for a current collector of an electrode used in an electrode assembly of an electricity storage component.

(1) Component Composition of Aluminum Alloy for Current Collector of Electrode

The aluminum alloy foil for a current collector of an electrode of the present embodiment contains 1.0 to 2.0 mass % (hereafter, simply referred to as "%") of Fe, 0.01 to 0.2% of Si, 0.0001 to 0.2% of Cu, and 0.005 to 0.3% of Ti, and the remainder is Al and inevitable impurities.

Fe is an element that enhances strength when added, and is added at a rate of 1.0 to 2.0%. If an amount of added Fe is less than 1.0%, a number of fine particles of Ai-Fe based intermetallic compounds contributing to enhancement of strength decreases, and an amount of Fe contained as a solid solution in a cast plate manufactured by the continuous casting method decreases, so that it is difficult to ensure high strength. On the other hand, if an amount of added Fe is more than 2.0%, large particles of Al—Fe based or Al—Fe—Si based intermetallic compounds tend to crystallize out during continuous casting, which causes breakage or pinhole generation to occur during rolling, and thus is desirable. Note that the content rate of Fe may be within a range between any two values of 1.0, 1.1, 1.2, 1.3, 1.4, 1.5, 1.6, 1.7, 1.8, 1.9 and 2.0%.

Si is an element that enhances strength when added, and is added at a rate of 0.01 to 0.2%. If an amount of added Si is less than 0.01%, contribution to enhancement of strength is limited. Further, Si is contained as an impurity in an aluminum bare metal usually used, and it is necessary to use a highly pure bare metal in order to confine the rate to less than 0.01%, which is practically difficult from an economical point of view. If an amount of added Si is more than 0.2%, particles of Al—Fe based intermetallic compounds that crystallize out during continuous casting become large in size and small in number, so that a number of fine particles of Al—Fe based intermetallic compounds contributing to enhancement of strength becomes small, and thus strength is lowered. Note that the content rate of Si may be within a range between any two values of 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19 and 0.2%.

Cu is an element that enhances strength when added, and is added at a rate of 0.0001 to 0.2%. It is necessary to use a highly pure bare metal in order to confine a content rate of Cu to less than 0.0001%, which is practically difficult from an economical point of view. On the other hand, if an amount of added Cu is more than 0.2%, work hardening is raised so that breakage tends to occur during foil rolling. Note that the content rate of Cu may be within a range between any two values of 0.0001, 0.0005, 0.001, 0.005, 0.01, 0.05, 0.1 and 0.2%.

Ti is added at a rate of 0.005 to 0.2% as an agent for enhancement of strength and fining of grain size. Addition of Ti fines grain size in a cast plate manufactured by the continuous casting method, so that cracking of the cast plate can be prevented and foil rolling property can be enhanced greatly. Further, since added Ti is contained in the aluminum alloy as a solid solution, it also contributes to enhancement of strength significantly. If an amount of Ti is less than 0.005%, it hardly functions as a grain-refining agent, so that grain size become large, which leads to easy occurrence of breakage during cold rolling or foil rolling. On the other hand, if an amount of Ti is more than 0.2%, large particles of intermetallic compounds tend to be formed in continuous casting, so that breakage occurs easily during cold rolling or foil rolling. Note that the content rate of Ti may be within a range between any two values of 0.005, 0.01, 0.05, 0.1 and 0.2%.

In addition to those mentioned above, inevitable impurities such as Cr, Ni, B, Zn, Mn, Mg, V and Zr are contained in the material. These inevitable impurities are each preferably 0.02% or less, and a total amount thereof is preferably 0.15% or less.

(2) Amount of Fe Contained as Solid Solution

An amount of Fe contained as a solid solution in an aluminum alloy foil for a current collector of an electrode of the present embodiment is 300 ppm or more. In order to achieve an amount contained as a solid solution of 300 ppm or more, it is necessary to set an amount of Fe added to aluminum alloy within a range of 1.0 to 2.0% and manufacturing should be performed by a continuous casting method where a cooling rate is high. The larger an amount of Fe added in an aluminum alloy is, the larger an amount of Fe contained as a solid solution in a cast plate manufactured by a continuous casting method can be. In a cast plate manufactured by a continuous casting method, since Fe is contained as a supersaturated solid solution, it is possible to maintain the amount of Fe contained as a solid solution at a high level until a final foil thickness is obtained, by performing only cold rolling and foil rolling sequentially without performing a heating process and the like. If an amount of Fe contained as a solid solution is less than 300 ppm, strength as well as strength after a drying step performed after applying an active material decreases, which is undesirable.

Although no upper limit is particularly specified for an amount of Fe contained as a solid solution, when an amount of Fe added to an aluminum alloy is set in the range of 1.0 to 2.0%, the amount of Fe contained as a solid solution often becomes 700 ppm or less. Note that the amount of Fe contained as a solid solution may be any one of the values of 300, 400, 500, 600 and 700 ppm or more, and may be within a range between any two of the values.

(3) Intermetallic Compound

On a surface of an aluminum alloy foil for a current collector of an electrode of the present embodiment, particles of intermetallic compounds having an equivalent circle diameter of 0.1 to 1.0 μm exist at $1.0 \times 10^5$ particles/mm$^2$ or higher. These intermetallic compounds have an Al—Fe based or Al—Fe—Si based composition, and crystallize out homogeneously and finely during continuous casting. These fine particles of intermetallic compounds can enhance strength of the aluminum alloy foil by dispersion strengthening, and can also suppress decrease of strength after a drying step performed after applying an active material.

If the equivalent circle diameter is smaller than 0.1 μm and the number of particles of the intermetallic compounds is less $1.0 \times 10^5$ particles/mm$^2$, contribution to dispersion strengthening is small, so that strength after a heating process corresponding to a drying step decreases greatly. It is desirable to reduce particles of intermetallic compounds whose equivalent circle diameter is greater than 1.0 μm, because their contribution to strength by dispersion strengthening is small and they can also be origination points of pinholes.

A number of particles of intermetallic compounds can be known by observing a surface of an aluminum alloy foil by a scanning electron microscope (SEM). Specifically, a surface of an aluminum alloy foil is mirror finished by electrochemical polishing, then thirty fields of backscattered electron images are observed at a magnification of 1,000, and a number of particles of intermetallic compounds are quantified by an image analyzer. Thereafter, an area of each particle of intermetallic compounds is regarded as an area of a perfect circle, and a diameter of the circle is defined as an equivalent circle diameter.

Although no upper limit is particularly specified for a number of particles of intermetallic compounds, when an amount of Fe added to an aluminum alloy is set in the range of 1.0 to 2.0%, a number of particles of intermetallic compounds having a diameter smaller than 0.1 μm is often $5.0 \times 10^5$ particles/mm$^2$ or less. Note that the number of particles of intermetallic compounds may be any one of the values of $1.0 \times 10^5$ particles/mm$^2$, $1.2 \times 10^5$ particles/mm$^2$, $1.3 \times 10^5$ particles/mm$^2$, $1.4 \times 10^5$ particles/mm$^2$, $1.5 \times 10^5$ particles/mm$^2$, $1.6 \times 10^5$ particles/mm$^2$, $1.7 \times 10^5$ particles/mm$^2$, $1.8 \times 10^5$ particles/mm$^2$, $1.9 \times 10^5$ particles/mm$^2$, $2.0 \times 10^5$ particles/mm$^2$, $3.0 \times 10^5$ particles/mm$^2$, $4.0 \times 10^5$ particles/mm$^2$ and $5.0 \times 10^5$ particles/mm$^2$ or more, and may be within a range between any two of the values.

(4) Foil Thickness of Aluminum Alloy Foil

A thickness of an aluminum alloy foil (thickness after final cold rolling) for a current collector of an electrode of the present embodiment is preferably 6 to 30 μm. If a thickness is less than 6 μm, pinholes tend to be formed during foil rolling, which is undesirable. If a thickness is more than 30 μm, volume and weight of a current collector of an electrode within identical volume increases, so that when used as a current collector of an electrode or the like of a lithium ion secondary cell, volume and weight of an active material which can be applied decrease. In the case of a lithium ion secondary cell, this causes reduction in cell capacity and thus is undesirable. Note that the thickness may be within a range between any two values of 6, 7, 8, 9, 10, 11, 12, 13, 14, 15, 16, 17, 18, 19, 20, 21, 22, 23, 24, 25, 26, 27, 28, 29 and 30 μm.

(5) Electric Conductivity

It is preferable that electric conductivity of an aluminum alloy foil for a current collector of an electrode of the present embodiment is 50% IACS or more. Electric conductivity is especially indicative of a state of solid solution of each of added elements in an aluminum alloy foil. In a case where a current collector of an electrode employing an aluminum alloy foil of the present embodiment is used for a lithium ion secondary cell, if electric conductivity is less than 50% IACS, cell capacity decreases when used at a high current value such that a discharge rate exceeds 5 C, which is undesirable. Note that 1 C refers to a current value that when constant current discharge is performed at that current value on a cell having capacity of a nominal capacity value, discharge completes in one hour.

(6) Strength Before Drying Step

It is preferable that tensile strength before a drying step of an aluminum alloy foil for a current collector of an electrode of the present embodiment is 220 MPa or more. Further, it is also desired that 0.2% yield strength before a drying step is high, so that it is preferably 200 MPa or more. If tensile strength before a drying step is less than 220 MPa or 0.2% yield strength before a drying step is less than 200 MPa, since strength is insufficient, breakage or cleavage tends to occur due to a tensile force applied during application of an active material.

Strength of an aluminum alloy foil for a current collector of an electrode of the present embodiment before a drying step (tensile strength or 0.2% yield strength) is, in other words, strength after final cold rolling (tensile strength or 0.2% yield strength). For an aluminum alloy in which only Fe, Si, Cu and Ti are added mainly, by making each element be contained in a larger amount as a solid solution and causing intermetallic compounds crystallizing out during continuous casting to disperse homogeneously and finely, movement of dislocations is suppressed, so that higher strength can be achieved. Further, in a continuous casting method, since a cooling rate is higher than that in a semi-continuous cast/rolling method, an amount of added element contained as a solid solution increases, so that work hardening also increases. As a result, strength of an aluminum alloy foil can be enhanced more by cold rolling and foil rolling. Note that, in the present description, "after final cold rolling" means a state after final cold rolling and before performing a heating process for altering physical properties of an aluminum alloy foil, and "foil rolling" is one kind of cold rolling.

Note that although no upper limit is particularly specified for tensile strength before a drying step, generally, it is often 400 MPa. Note that tensile strength before a drying step may be any one of the values of 220, 230, 240, 250, 260, 270, 280, 290, 300, 310, 320, 330, 340, 350 and 400 MPa or more, and may be within a range between any two of the values.

Note that although no upper limit is particularly specified also for 0.2% yield strength before a drying step, generally, it is often 400 MPa. Note that 0.2% yield strength before a drying step may be any one of the values of 200, 210, 220, 230, 240, 250, 260, 270, 280, 290, 300, 310, 320, 330, 340, 350 and 400 MPa or more, and may be within a range between any two of the values.

(7) Strength after Drying Step

While an aluminum alloy foil for a current collector of an electrode of the present embodiment can be used suitably as a positive electrode material, manufacturing steps of this positive electrode material include a drying step after applying an active material paste for the purpose of removing a solvent in the active material paste, in which a heating process is usually performed at about 100 to 200° C. Generally, in a heating process in the temperature range noted above, an aluminum alloy foil sometimes softens causing changes in mechanical properties, therefore, mechanical properties of an aluminum alloy foil after the heating process are important. Due to external thermal energy, dislocations are activated and move easily, and strength decreases in a recovery process. To prevent strength decrease in the recovery process of the heating process at 100 to 200° C., suppressing movement of dislocations by elements contained as a solid solution and intermetallic compounds dispersed finely in the aluminum alloy is effective.

Strength (tensile strength or 0.2% yield strength) of an aluminum alloy foil for a current collector of an electrode of the present embodiment after a heating process is greatly affected by an amount of Fe contained as a supersaturated solid solution and fine particles of intermetallic compounds that crystallize out during continuous casting. Particularly, as a cooling rate during continuous casting is higher, Fe is contained more supersaturatedly as a solid solution, and more particles of intermetallic compounds crystallize out finely, so that movement of dislocations is hindered and high strength can be maintained after a heating process.

For an aluminum alloy foil for a current collector of an electrode of the present embodiment, although no further limitations are imposed as far as a composition, an amount of Fe contained as a solid solution, as well as a size and a number of particles of intermetallic compounds are properly set as described above, it is preferable that tensile strength after a drying step, which is strength when manufactured into an electrode material provided with an aluminum alloy foil and an active material, is 220 MPa or more. When an active material layer is formed, a drying step during application is performed at 100 to 200° C., and the temperature range in the drying step is adjusted properly according to conditions such as the active material paste, however, in the present embodiment, a condition of 200° C. for 15 minutes is employed to optimize tensile strength. Further, it is also desired that 0.2% yield strength after the drying step noted above is also high, and 200 MPa or more is preferable. If tensile strength after the drying step is less than 220 MPa or 0.2% yield strength after the drying step is less than 200 MPa, strength is sometimes insufficient since an aluminum alloy foil tends to deform easily during press processing after the drying step, and wrinkling and bending tend to occur easily during taking up after press processing.

Further, in the present embodiment, it is further preferable that tensile strength after a drying step is 220 MPa, even when a condition to be employed is further classified into sub-conditions defined as low temperature and long period, meddle temperature and middle period, and high temperature and short period, and any one of the heating process of 100° C. for 24 hours, 150° C. for 3 hours, and 200° C. for 15 minutes is performed. Further, 0.2% yield strength after a drying step is also desired to be high even any one of the heating process of 100° C. for 24 hours, 150° C. for 3 hours, and 200° C. for 15 minutes is performed, and 200 MPa or higher is more preferable. The fact that even when any one of the heating processes of low temperature and long period, meddle temperature and middle period, and high temperature and short period is performed, tensile strength after the drying step is 220 MPa or more or 0.2% yield strength after the drying step is 200 MPa or more, as noted above, can prevent occurrence of wrinkles in a press step more certainly.

Note that although no upper limit is particularly specified for tensile strength after the drying step, generally, it is often 400 MPa. Note that tensile strength after the drying step may be any one of the values of 220, 230, 240, 250, 260, 270, 280, 290, 300, 310, 320, 330, 340, 350 and 400 MPa or more, and may be within a range between any two of the values.

Further, although no upper limit is particularly specified also for 0.2% yield strength after the drying step, generally, it is often 400 MPa. Note that 0.2% yield strength after the drying step may be any one of the values of 200, 210, 220, 230, 240, 250, 260, 270, 280, 290, 300, 310, 320, 330, 340, 350 and 400 MPa or more, and may be within a range between any two of the values.

<Manufacturing Method of Aluminum Alloy Foil for Current Collector of Electrode>

A manufacturing method of an aluminum alloy foil for a current collector of an electrode of the present embodiment includes a step of manufacturing a cast plate of the composition noted above by a continuous casting method, and a step of performing cold rolling and foil rolling on the cast plate without performing a heating process. According to the method, an aluminum alloy foil for a current collector of an electrode can be manufactured at low cost that has high strength before and after a drying step as well as high electric conductivity. Therefore, an aluminum alloy foil obtained by the method hardly deforms during press processing and can prevent exfoliation of an active material or the like and breakage during slitting. Accordingly, an aluminum alloy foil obtained by the method can be employed suitably as a current collector of an electrode used in an electrode assembly of an electricity storage component.

(1) Continuous Casting

Steps to manufacture a cast plate having the composition noted above by a continuous casting method include a step to make molten aluminum alloy having the composition noted above, and a step to cast/roll continuously on the molten aluminum alloy to manufacture a cast plate. Representative continuous casting methods include a twin-roll type continuous casting method, a twin-belt type continuous casting method and the like. The twin-roll type continuous casting/rolling method is a method in which a molten aluminum alloy is supplied from a supply nozzle made of a refractory material to a gap between two opposed rolls cooled with water to cast/roll a thin plate continuously, of which 3C method and Hunter method and the like have been employed industrially. The twin-belt type continuous casting method is a manufacturing method in which molten metal is supplied to a gap between opposed rotatable belts arranged one above the other and cooled with water, and the molten metal is cooled by surfaces of the belts to solidify, to cast/roll a thin plate continuously.

The present embodiment can employ either of the twin-roll type continuous casting method and the twin-belt type continuous casting method, and thus is not limited to a specific manufacturing method. Note that in the twin-roll type continuous casting method, a cooling rate is larger than that in the twin-belt type casting method, and a size of particles of intermetallic compounds crystallizing out is more reduced, so that an aluminum alloy foil having better properties can be obtained. Hereafter, as an example of the continuous casting method, a manufacturing method by the twin-roll type continuous casting method will be described.

An aluminum alloy containing Fe, Si and Cu in the composition range noted above is melted into molten metal, transferred to a holding furnace and held therein. Then the molten metal is subjected to a known degassing process in a degassing tank and passed through a filter to remove casting inclusion, and thereafter, solidified and rolled at a rolling portion cooled with water. Ti is added to the molten metal in the form of an Al—Ti master alloy, an Al—Ti—B master alloy or the like, as a grain-refining agent. Note that methods for adding the master alloy include, for example, adding into the holding furnace, in the form of a waffle-like clump, and adding before or after the degassing process or before or after passing through the filter, in the form of a rod. In the present embodiment, grain-refining in a cast plate after the continuous casting can be reduced in size by either of the above methods, so that plate cracking of the cast plate can be prevented and rollability during cold rolling and foil rolling can be enhanced.

Molten metal temperature when casting is performed by the twin-roll type continuous casting method is preferably 680° C. to 800° C. The molten metal temperature is a temperature of a headbox arranged immediately before a supply nozzle for the molten metal. If the molten metal temperature is lower than 680° C., intermetallic compounds are generated within the supply nozzle, which are included in a plate-like ingot, sometimes causing plate breakage to occur during cold rolling. If the molten metal temperature is higher than 800° C., molten aluminum alloy sometimes does not solidify sufficiently between the rolls during casting so that a normal cast plate is not yielded. Thickness of a cast plate manufactured by the continuous casting method is preferably 20 mm or less. If the thickness is larger than 20 mm, a solidification rate during continuous casting becomes low, so that particles of intermetallic compounds crystallizing out tend to be large and a number of fine particles of intermetallic compounds that contribute to dispersion strengthening decreases, which is undesirable.

(2) Cold Rolling and Foil Rolling after Continuous Casting

Then, by performing cold rolling and foil rolling sequentially on the cast plate obtained by the continuous casting method mentioned above, a desired aluminum alloy foil can be yielded. At this time, it is preferable that no heating process is performed between each of the steps of cold rolling. If a heating process is performed, part of Fe which has been contained as a supersaturated solid solution during continuous casting crystallizes out, so that strength as well as strength after a drying step is lowered, which is undesirable. Note that methods to perform cold rolling and foil rolling are not limited particularly. According to the above manufacturing method, unlike in the conventional manufacturing method where a heating process is performed on a cast plate manufactured by a semi-continuous casting method or a continuous casting method, only cold rolling and foil rolling are performed after continuous casting, so that it is also possible to reduce manufacturing cost greatly.

<Current Collector of Electrode and Electrode Assembly>

A current collector of an electrode of the present embodiment is provided with an aluminum alloy foil for a current collector of an electrode described above. By forming an active material layer or an electrode material layer on at least one surface of the current collector of an electrode of the present embodiment, an electrode assembly of the present embodiment can be obtained. In a case of an electrode assembly having an electrode material layer for an electricity storage component, by using this electrode structure, a separator and a non-aqueous electrolyte solution, an electrode assembly (including a component for a cell) for a non-aqueous electrolyte cell, for example, for a lithium ion secondary cell, can be manufactured. In an electrode assembly for a non-aqueous electrolyte cell and a non-aqueous electrolyte cell of the present embodiment, for members other than a current collector of an electrode, known members for non-aqueous electrolyte cell can be employed.

Here, an active material layer formed in the electrode assembly of the present embodiment may be one proposed for a non-aqueous electrolyte cell. For example, if a positive electrode assembly is manufactured, for a current collector employing an aluminum alloy foil for a current collector of an electrode of the present embodiment, $LiCoO_2$, $LiMnO_4$, $LiNiO_2$ or the like is used as an active material, carbon black such as acetylene black or the like is used as a conductive material, these materials are dispersed in PVDF which is a binder or in water dispersion type PTFE to form paste, and the paste is applied and dried, to yield a positive electrode assembly.

If an electrode assembly for a negative electrode is made, for an aluminum alloy foil for a current collector of an electrode of the present embodiment, for example, black lead, graphite, mesocarbon microbeads or the like is used as an active material, these materials are dispersed in CMC (carboxymethylcellulose) which is a thickener and then mixed with SBR (styrene-butadiene rubber) to form paste, and the paste is applied and dried as a material for forming an active material, to yield a current collector of a negative electrode.

Heretofore embodiments of the present invention have been described with reference to the drawings, however, these are merely examples of the present invention, and various configurations can be employed other than described above.

EXAMPLES

Hereafter, the present invention will be describe in more detail with reference to examples, however, it should be noted that the present invention is not limited to these examples.

<Manufacturing Method of Aluminum Alloy Foil>

In Examples 1 to 10, a cast plate having a thickness of 8 mm was manufactured by applying the twin-roll type continuous casting method to a molten aluminum alloy having the composition shown in Table 1. The cast plate manufactured by continuous casting was subjected to cold rolling and foil rolling, without being subjected to a heating process in middle of the steps, to yield an aluminum alloy foil having a foil thickness of 15 μm.

Also in Comparative Examples 11 to 16, an aluminum alloy foil having a foil thickness of 15 μm was obtained by the twin-roll type continuous casting method under the conditions shown in Table 1 similarly to the examples. In Comparative Example 17, a cast plate having a thickness of 8 mm after continuous casting was cold rolled into a thickness of 3.0 mm, and subsequently, intermediate annealing was performed at 450° C. for 10 hours. Thereafter, cold rolling and foil rolling were performed sequentially to yield an aluminum alloy foil having a foil thickness of 15 μm.

In Comparative Examples 19 and 20, an ingot having a thickness of 500 mm was cast by a semi-continuous casting method, which is a conventional manufacturing method. Then, a homogenizing process was performed at 500° C. for one hour, and subsequently, hot rolling was performed to yield a hot rolled plate having a thickness of 4 mm. Thereafter, cold rolling was performed until a thickness of 0.8 mm, and intermediate annealing was performed at 350° C. for four hours in a batch furnace. After the intermediate annealing, cold rolling and foil rolling were performed in succession to yield an aluminum alloy foil having a foil thickness of 15 μm.

Then, a positive electrode material of a lithium ion secondary cell was manufactured from each aluminum alloy foil. PVDF which would function as a binder was added to an active material composing chiefly of $LiCoO_2$ to yield positive electrode slurry. The positive electrode slurry was applied onto both surfaces of the aluminum alloy foil described above having a width of 30 mm, and subjected to a heating process under three conditions of at 100° C. for 24 hours, at 150° C. for 3 hours, and at 200° C. for 15 minutes for drying, and thereafter, press processing by a roll press machine was performed to increase density of the active material.

Each of the manufactured aluminum alloy foils was measured and evaluated based on the criteria below, with respect to tensile strength, 0.2% yield strength, electric conductivity, number of particles of intermetallic compounds, number of occurrences of breakage during foil rolling, number of pinholes, tensile strength and 0.2% yield strength after a heating process at 100° C. for 24 hours, tensile strength and 0.2% yield strength after a heating process at 150° C. for 3 hours, as well as tensile strength and 0.2% yield strength after a heating process at 200° C. for 15 minutes. Results are shown in Table 2. Further, each of the positive electrode materials was evaluated based on the criteria below, with respect to presence/absence of occurrence of breakage in the active material-applying step and presence/absence of occurrence of exfoliation of the active material. Results are shown in Table 3.

<Tensile Strength and 0.2% Yield Strength>

Tensile strength of an aluminum alloy foil clipped in a rolling direction was measured using an Instron-type tension testing machine AG-10kNX manufactured by Shimadzu Corporation. Measuring conditions were as follows: test piece size of 10 mm×100 mm, chuck to chuck distance of 50 mm, and crosshead speed of 10 mm/min. Further, assuming a drying step, the aluminum alloy foils which had been subjected to the heating processes at 100° C. for 24 hours,

TABLE 1

| | No. | Casting Method | Chemical Component (mass %) | | | | | Heating Condition after Continuous Casting | Foil Thickness (μm) |
| --- | --- | --- | --- | --- | --- | --- | --- | --- | --- |
| | | | Si | Fe | Cu | Ti | Al and Inevitable Impurities | | |
| Example | 1 | Twin-Roll | 0.04 | 1.29 | 0.010 | 0.006 | Remainder | None | 15 |
| | 2 | Type | 0.07 | 1.46 | 0.04 | 0.014 | Remainder | None | 15 |
| | 3 | Continuous | 0.12 | 1.79 | 0.07 | 0.022 | Remainder | None | 15 |
| | 4 | Casting | 0.05 | 1.18 | 0.12 | 0.19 | Remainder | None | 15 |
| | 5 | Method | 0.01 | 1.33 | 0.15 | 0.027 | Remainder | None | 15 |
| | 6 | | 0.04 | 1.04 | 0.04 | 0.009 | Remainder | None | 15 |
| | 7 | | 0.02 | 1.64 | 0.0002 | 0.032 | Remainder | None | 15 |
| | 8 | | 0.19 | 1.55 | 0.03 | 0.066 | Remainder | None | 15 |
| | 9 | | 0.14 | 1.98 | 0.08 | 0.041 | Remainder | None | 15 |
| | 10 | | 0.12 | 1.24 | 0.19 | 0.11 | Remainder | None | 15 |
| Comparative Example | 11 | Twin-Roll | 0.36 | 1.19 | 0.0015 | 0.015 | Remainder | None | 15 |
| | 12 | Type | 0.04 | 0.69 | 0.0011 | 0.011 | Remainder | None | 15 |
| | 13 | Continuous | 0.16 | 2.71 | 0.16 | 0.058 | Remainder | None | 15 |
| | 14 | Casting | 0.04 | 1.18 | 0.38 | 0.014 | Remainder | None | 15 |
| | 15 | Method | 0.05 | 1.21 | 0.04 | 0.002 | Remainder | None | 15 |
| | 16 | | 0.06 | 1.15 | 0.02 | 0.41 | Remainder | None | 15 |
| | 17 | | 0.05 | 1.12 | 0.02 | 0.031 | Remainder | 450° C. × 10 h | 15 |
| | 18 | Semi- | 0.04 | 1.06 | 0.03 | 0.016 | Remainder | Homogenizing Process 500° C. × 1 h Intermediate Annealing 350° C. × 4 h | 15 |
| | 19 | Continuous Casting Method | 0.09 | 1.59 | 0.04 | 0.018 | Remainder | | 15 | at 150° C. for 3 hours, and at 200° C. for 15 minutes were also clipped in the rolling direction and their tensile strength was measured in a similar manner as above. Moreover, 0.2% yield strength was obtained from a stress-strain curve.

<Amount of Fe Contained as Solid Solution>

An amount of Fe contained as a solid solution was measured as follows: 1.0 g of an aluminum alloy foil and 50 mL of phenol were heated to 200° C. to decompose; 100 mL of benzyl alcohol was added as a solidification preventive material, and thereafter, intermetallic compounds were filtered off; and the filtrate was measured by ICP emission spectrometry.

<Electric Conductivity>

Electric conductivity was obtained by measuring electric resistance by the four terminal method and converting it into electric conductivity.

<Number of Particles of Intermetallic Compound>

A number of particles of intermetallic compounds was measured by observing a surface of an aluminum alloy foil by a scanning electron microscope (SEM). A surface of an aluminum alloy foil was mirror finished by electrochemical polishing, then thirty fields of backscattered electron images were observed at a magnification of 1,000, and a number of particles of intermetallic compounds was quantified by an image analyzer. Thereafter, an area of each particle of intermetallic compounds was regarded as an area of a perfect circle, and a diameter of the circle was defined as an equivalent circle diameter.

<Presence/Absence of Occurrence of Breakage in Active Material-Applying Step>

The positive material which had been subjected to the active material-applying step was visually examined to determine whether breakage had occurred or not. A case where no breakage was observed was judged to be success and a case where occurrence of breakage was observed was judged to be failure.

<Presence/Absence of Occurrence of Exfoliation of Active Material>

Presence/absence of occurrence of exfoliation of the active material was evaluated by visual observation. A case where no exfoliation was observed was judged to be success and a case where occurrence of exfoliation was observed even partially was judged to be failure.

TABLE 2

Aluminum Alloy Foil

| | | Bare Foil Strength | | Electric | Amount of Fe | Number of Particles of | | Heating Condition in Drying Step | | | | | |
| | | | | | | | | Heating 100° C. × 24 h | | Heating 150° C. × 3 h | | Heating 200° C. × 15 m | |
| | No. | Tensile strength (MPa) | 0.2% Yield Strength (MPa) | Conductivity (% IACS) | Contained As Solid Solution | Intermetallic Compounds (×$10^5$ Particles/$mm^2$) | Breakage in Foil Rolling | Tensile strength (MPa) | 0.2% Yield Strength (MPa) | Tensile strength (MPa) | 0.2% Yield Strength (MPa) | Tensile strength (MPa) | 0.2% Yield Strength (MPa) |
|---|---|---|---|---|---|---|---|---|---|---|---|---|---|
| Example | 1 | 249 | 208 | 54.8 | 428 | 1.2 | None | 261 | 218 | 264 | 222 | 259 | 223 |
| | 2 | 276 | 233 | 53.7 | 598 | 1.4 | None | 297 | 254 | 295 | 253 | 299 | 251 |
| | 3 | 297 | 255 | 52.6 | 702 | 1.6 | None | 312 | 271 | 319 | 280 | 317 | 276 |
| | 4 | 265 | 233 | 55.2 | 401 | 1.1 | None | 281 | 242 | 283 | 245 | 286 | 247 |
| | 5 | 288 | 243 | 54.3 | 455 | 1.3 | None | 302 | 254 | 297 | 251 | 299 | 253 |
| | 6 | 242 | 200 | 55.7 | 306 | 1.0 | None | 248 | 207 | 246 | 205 | 244 | 204 |
| | 7 | 281 | 240 | 53.5 | 665 | 1.5 | None | 287 | 247 | 285 | 248 | 284 | 243 |
| | 8 | 295 | 245 | 54.2 | 487 | 1.0 | None | 301 | 250 | 303 | 252 | 305 | 255 |
| | 9 | 335 | 296 | 50.7 | 921 | 1.8 | None | 351 | 312 | 358 | 317 | 356 | 314 |
| | 10 | 317 | 272 | 54.1 | 459 | 1.2 | None | 324 | 281 | 327 | 285 | 328 | 283 |
| Comparative | 11 | 235 | 198 | 55.9 | 234 | 0.7 | None | 226 | 184 | 215 | 182 | 211 | 178 |
| Example | 12 | 213 | 172 | 56.8 | 211 | 0.5 | None | 201 | 158 | 198 | 154 | 193 | 151 |
| | 13 | 356 | 321 | 48.2 | 1153 | 2.1 | Observed | 339 | 306 | 332 | 303 | 325 | 292 |
| | 14 | 315 | 274 | 53.7 | 356 | 1.1 | Observed | 292 | 255 | 288 | 249 | 284 | 245 |
| | 15 | 238 | 199 | 54.6 | 387 | 1.1 | Observed | 237 | 196 | 239 | 198 | 241 | 203 |
| | 16 | 254 | 223 | 54.4 | 402 | 1.2 | Observed | 258 | 226 | 259 | 228 | 262 | 227 |
| | 17 | 215 | 179 | 58.9 | 78 | 1.4 | None | 195 | 156 | 191 | 152 | 187 | 146 |
| | 18 | 176 | 143 | 59.3 | 33 | 0.3 | None | 152 | 133 | 145 | 121 | 134 | 112 |
| | 19 | 198 | 162 | 58.6 | 25 | 0.4 | None | 163 | 140 | 156 | 131 | 142 | 121 |

TABLE 3

Positive Electrode Material

| | | Heating Condition in Drying Step | | | | | |
| | | Heating 100° C. × 24 h | | Heating 150° C. × 3 h | | Heating 200° C. × 15 m | |
| | No. | Breakage in Active Material Applying Step | Exfoliation of Active Material | Breakage in Active Material Applying Step | Exfoliation of Active Material | Breakage in Active Material Applying Step | Exfoliation of Active Material |
|---|---|---|---|---|---|---|---|
| Example | 1 | None | None | None | None | None | None |
| | 2 | None | None | None | None | None | None |

TABLE 3-continued

Positive Electrode Material

Heating Condition in Drying Step

|  | No. | Heating 100° C. × 24 h | | Heating 150° C. × 3 h | | Heating 200° C. × 15 m | |
| --- | --- | --- | --- | --- | --- | --- | --- |
|  |  | Breakage in Active Material Applying Step | Exfoliation of Active Material | Breakage in Active Material Applying Step | Exfoliation of Active Material | Breakage in Active Material Applying Step | Exfoliation of Active Material |
|  | 3 | None | None | None | None | None | None |
|  | 4 | None | None | None | None | None | None |
|  | 5 | None | None | None | None | None | None |
|  | 6 | None | None | None | None | None | None |
|  | 7 | None | None | None | None | None | None |
|  | 8 | None | None | None | None | None | None |
|  | 9 | None | None | None | None | None | None |
|  | 10 | None | None | None | None | None | None |
| Comparative Example | 11 | None | None | Observed | Observed | Observed | Observed |
|  | 12 | Observed | Observed | Observed | Observed | Observed | Observed |
|  | 13 | None | None | None | None | None | None |
|  | 14 | None | None | None | None | None | None |
|  | 15 | None | None | None | None | None | None |
|  | 16 | None | None | None | None | None | None |
|  | 17 | Observed | Observed | Observed | Observed | Observed | Observed |
|  | 18 | Observed | Observed | Observed | Observed | Observed | Observed |
|  | 19 | Observed | Observed | Observed | Observed | Observed | Observed |

<Discussion on Results>

From the results of the experiments described above, the followings are known.

In Examples 1 to 10, there were no breakage in the active material-applying step and no exfoliation of the active material, electric conductivity was high, and thus, evaluation is good.

In Comparative Example 11, Si was contained in large amount, so that the number of particles of intermetallic compounds were small, which lead to the fact that strength after performing the heating process at 150° C. for 3 hours or at 200° C. for 15 minutes was insufficient, resulting in occurrence of breakage in the active material-applying step and exfoliation of the active material.

In Comparative Example 12, Fe was contained in small amount, so that strength before performing a drying step and strength after performing the drying step at 100° C. for 24 hours, at 150° C. for 3 hours or at 200° C. for 15 minutes were insufficient, resulting in occurrence of breakage in the active material-applying step and exfoliation of the active material.

In Comparative Example 13, Fe was contained in large amount, so that many pinholes were formed and breakage during foil rolling occurred.

In Comparative Example 14, Cu was contained in large amount, so that work hardening became too high, resulting in occurrence of breakage during foil rolling.

In Comparative Example 15, Ti was added in small amount, so that grain of the cast plate became large, resulting in occurrence of plate breakage during cold rolling.

In Comparative Example 16, Ti was added in large amount, so that many large particles of intermetallic compounds were formed, resulting in occurrence of plate breakage during cold rolling.

In Comparative Example 17, a heating process was performed on the cast plate after continuous casting, so that large amount of Fe contained as a supersaturated solid solution crystallized out, resulting in insufficient strength and strength after performing the drying step at 100° C. for 24 hours, at 150° C. for 3 hours or at 200° C. for 15 minutes, and occurrence of breakage in the active material-applying step and exfoliation of the active material.

In Comparative Examples 18 and 19, manufacturing was performed by the semi-continuous casting method, so that small amount of Fe was contained as a solid solution, resulting in insufficient strength of the bare foil and insufficient strength after performing the drying step at 100° C. for 24 hours, at 150° C. for 3 hours or at 200° C. for 15 minutes, and occurrence of breakage in the active material-applying step and exfoliation of the active material.

Thus far, the present invention has been described based on examples. The examples are for illustrative purpose only, and a person having ordinary skill in the art will understand that a variety of modifications are possible, and that such modifications are also within the scope of the present invention.

What is claimed is:

1. An aluminum alloy foil for a current collector of an electrode, containing 1.0 to 2.0% of Fe, 0.01 to 0.2% of Si, 0.0001 to 0.2% of Cu, and 0.005 to 0.3% of Ti, the remainder being Al and inevitable impurities, wherein
    an amount of Fe contained as a solid solution is 300 ppm or more, and
    particles of intermetallic compounds having an equivalent circle diameter of 0.1 to 1.0 μm exist at $1.0 \times 10^5$ particles/mm$^2$ or more.

2. A current collector of an electrode comprising an aluminum alloy foil for a current collector of an electrode of claim 1.

3. An electrode assembly comprising
    a current collector of an electrode of claim 2, and
    an active material layer or an electrode material layer formed on said current collector of an electrode.

* * * * *